Patented Mar. 20, 1934

1,951,870

UNITED STATES PATENT OFFICE 1,951,870

PROCESS OF OBTAINING PRODUCTS FROM TOAD POISONS

Hans Jensen, Baltimore, Md., and Ko Kuei Chen, Indianapolis, Ind., assignors to Eli Lilly and Company, Indianapolis, Ind., a corporation of Indiana No Drawing. Application March 1, 1932, Serial No. 596,154

12 Claims. (Cl. 167—74)

It is the object of our invention to provide a general process suitable for obtaining separately various ingredients of toad poisons; and to isolate by that process certain new products never previously obtained.

Toads in general secrete a poison, which is found in various external glands of the toad, but especially in glands located at the back of the head, which may be called parotid or parotoid glands. These glands in general are unconnected with any secretion-ejecting organs; but the secretions from the glands may be obtained by certain stimuli, as by squeezing the glands. These secretions can be obtained from many different kinds of toads; and so far as we are aware are found in some form in practically all toads.

The Chinese have for centuries made use of their medicine of a toad poison obtained from some kind of Chinese toad, although we are not certain what species of toad that is. This Chinese toad poison is available on the Chinese market in the form of cakes, which generally speaking are about the size and shape of a doughnut save that they are flattened. The manner of the preparation of these cakes of Chinese toad poison is not known to us, but is kept secret by the Chinese druggists and only the finished cakes are available.

By our process we can isolate a number of ingredients, which considered generically are found in the various toad poisons, including those which are expressed directly from toad-glands and the dried cakes of Chinese toad poison. While some examples in the several generic classes of ingredients which are obtainable by our process have been obtained by others preceding us, many of those ingredients have not heretofore been isolated. In addition, those various classes of ingredients have not been obtainable heretofore at different parts of the same process, and so far as we are aware no general process has heretofore been known for obtaining in the same process these different classes of ingredients.

The different class of ingredients which are or may be present in toad poisons, so far as now known, are six in number, as follows:
1. Cholesterol
2. Bufagin
3. Bufotoxin
4. Bufotenine
5. Epinephrin
6. Suberic acid By our process we obtain and separate ingredients belonging to the first four classes above given, but our process set forth in this application has no bearing on the isolation of products in the fifth and sixth classes.

In the classes above given, the first, fifth, and sixth are specific chemical entities; but the second, third, and fourth, or bufagin, bufotoxin, and bufotenine, are identified by names which are there used generically, although the same names have already been used by other investigators to denote a specific bufagin, a specific bufotoxin, and a specific bufotenine respectively.

The three classes of ingredients in Classes 2, 3, and 4 have certain general similarities in their properties, as follows:

The bufagins (Class 2) has a physiological action on the heart similar to that of digitalis, but their action is less persistent than that of digitalis. They can be isolated in crystalline form, are quite insoluble in water and petroleum ether, but are soluble in alcohols and chloroform. They are stable in neutral alcoholic solution, but decompose on being heated in alkaline or acid solution. They are unsaturated neutral compounds; and contain a lactone group, and one or more hydroxy groups one of which is linked with an acid, either acetic acid or formic acid.

The bufotoxins (Class 3) have a physiological action on the heart generally similar to that of the bufagins. They can also be isolated in crystalline form, are quite insoluble in water, ether, and petroleum ether, and are somewhat soluble in alcohol. They are stable in neutral alcoholic solution, but decompose on being heated in alkaline or acid solutions. They have greater molecular weight than the corresponding bufagins, and in general are formed by unions of the bufagins with suberic acid and arginine; so that they contain nitrogen in the arginine component, whereas the bufagins proper do not contain nitrogen.

The bufotenines (Class 4) have a pressor effect physiologically; and stimulate smooth muscle. They have the characteristics of an organic base, and form a water-insoluble salt with flavianic acid and with picric acid. Some bufotenines and their salts so formed may be unstable in alkali solutions, but they are stable in neutral and acid solutions.

Cholesterol (Class 1) has been isolated by others preceding us from Ch'an Su (Chinese toad poison), and from *Bufo vulgaris* (the European toad), and *Bufo formosus* (the Japanese toad).

A specific bufagin, previously called simply by the name bufagin, has heretofore been obtained from *Bufo marinus* (the Jamaian toad). A specific bufotoxin and a specific bufotenine, both previously called simply by those names, have heretofore been obtained from *Bufo vulgaris*, the European toad. But the bufagin obtained from *Bufo marinus*, and the bufotoxin and the bufotenine obtained from *Bufo vulgaris*, though called simply by those names by their discoverers, are actually merely specific instances under Classes 2, 3, and 4 above outlined; although those classes have by us been designated generically by the same names which the discoverers of those specific products gave their products.

We have obtained a number of specific products in those classes, and believe that most of them are different from one another.

In obtaining the various substances of Classes 1 to 4 inclusive, we proceed by the following general process:

The toad poison is obtained in dry form, either directly by purchase as in the case of Ch'an Su, or by squeezing the poison glands of the toad and drying the expressed poison at room temperature in the case of other toad poisons. The dry toad poison is then desirably pulverized to facilitate extraction, the pulverized material is then extracted with a solvent of the general class of alcohols and acetone, desirably at high concentration, such as 95% alcohol, at room temperature for several days. There may be repeated extractions of the same solvents, and the several extracts mixed. Desirably each extraction is with 95% alcohol, of about fifteen times the weight of the dried material being extracted—such as 150 cc. of 90% alcohol for 10 grams of the dried secretion. The alcohol or acetone extract takes up substances of all four of Classes 1, 2, 3, and 4.

The combined extracts, after being suitably separated from the remaining solid as by decantation or filtration, are evaporated to substantial dryness under vacuum at low temperatures. The residue after evaporation is stirred up, and mixed well with distilled water—about seven or eight times as much water as the weight of the original dry secretion—and allowed to stand for one or two hours at room temperature. Then the liquid is suitably separated from the remaining solid, as by filtering or centrifuging. The water solution thus obtained contains substances of Class 4 in solution, and small amounts of substances of Classes 2 and 3 in colloidal suspension; but the cholesterol of Class 1 and the greater part of the substances of Classes 2 and 3 remain behind as a solid upon the filtering or centrifuging just referred to.

The water solution thus obtained is shaken out with chloroform or with alcohols which are non-miscible with water, such for instance as butyl alcohol or amyl alcohol. The chloroform or alcohol takes up any substances of Classes 2 and 3 that may be present. The aqueous solution is suitably separated from the cholorform or alcohol solution, as in a separatory funnel. The aqueous solution now contains the bufotenine of Class 4, substantially free from substances of Classes 1, 2, and 3.

This bufotenine may now be precipitated from this water solution as the flavianate or picrate, by the addition of flavianic acid or picric acid. This precipitate is the salt of the bufotenine, or blood-pressure-raising principle. In case the original secretion contained epinephrine and/or suberic acid, they will in some part go with the bufotenine through the process into the water solution; but they will not be precipitated from the water solution by the flavianic or picric acid.

The chloroform or alcohol solution that came by shaking out of the above water solution with chloroform or with butyl alcohol or amyl alcohol is evaporated to dryness under vacuum at low pressure, and the residue is combined with the water-insoluble part remaining after the extraction with water. Then the whole of this solid is dried in vacuo at low temperature, over a suitable drying agent, such as sulphuric acid or calcium chloride. The now substantially anhydrous material is extracted with an alcohol, most desirably with absolute methyl or ethyl alcohol, and filtered if necessary. To the alcoholic solution thus obtained dry ether is added until no further precipitate is formed. The precipitate thus obtained contains the bufotoxin, of Class 3, and some of the bufagin, of Class 2.

The bufotoxin thus obtained is purified by re-solution in absolute methyl or ethyl alcohol, and filtration if necessary, and fractional precipitation at varying concentrations of dry ether. The successive precipitates thus obtained generally contain successively less impurities and more nearly pure bufotoxin. For further purification, the various bufotoxin fractions are combined and the purifying process repeated. Sometimes the process has to be repeated several times before an absolute crystalline material is obtained. This is rather tedious and time-consuming. Instead of using ether as the precipitant in this purifying process, one can use water. Final purification of the bufotoxin is obtained by recrystallization from 75% alcohol.

The alcoholic ether solution from which the bufotoxin was precipitated still contains the materials of Classes 1 and 2—cholesterol and any bufagin. This solution is evoprated to dryness, under a vacuum at low temperature. The residue is dissolved in 95% alcohol, and the solution is diluted with water until a precipitate just starts to form. The solution is then shaken out several times with chloroform to which some ether has been added. The chloroform-ether solution thus obtained is dried with a drying agent which will not combine either with the chloroform or ether or with any cholesterol or bufagin present, such for instance as anhydrous sodium sulphate or anhydrous sodium carbonate; then filtered, and evaporated to dryness. This process of dissolving in alcohol, diluting with water, shaking out with chloroform, drying, and evaporation to dryness, may be repeated several times if necessary.

The residue after the last repetition of the process is dissolved in the smallest amount possible of absolute methyl alcohol or ethyl alcohol; dry ether is added, conveniently in about equal volume, and the whole allowed to stand over night in an ice box. In case a precipitate occurs, the solution is filtered to remove it; as the standing over night in the ice box is done to obtain this precipitate and get rid of it if impurities are present.

Then dry petroleum ether is slowly added, with constant stirring, until cloudiness appears; whereupon the solution is permitted to stand for an hour or so while the precipitate formed settles out. We use the term "petroleum ether" generically, to include various compounds of that class, such for instance as ordinary gasoline or ligroin.

On this first addition of this petroleum ether, the precipitate which is formed is generally dark and oily. This is separated, as by decantation.

It contains some of the bufagin, although not in pure form, and may be purified subsequently.

Then more petroleum ether is added, desirably in small increments, until no more precipitate is formed, with separation of successive precipitates. Usually all but the first precipitate will be in the form of a white crystalline powder, which is the bufagin. This bufagin may be purified by re-crystallization from 80% alcohol. The impure bufagin of the dark oily precipitate above referred to may also be purified in the same way, by a large number of recrystallizations.

The remaining solution, the solvent of which is a mixture of alcohol and ether and petroleum ether, contains the cholesterol, a little of the bufagin, and any of the higher fatty acids which may be present. The cholesterol may be isolated from this solution by evaporating the solution and extracting the residue with petroleum ether, in which the cholesterol and some of the fatty acids dissolve, leaving behind any remaining bufagin and any other fatty acids. The petroleum ether solution is separated from the residue, as by decantation or filtration, evaporated to dryness, and extracted with hot alcohol. The hot alcohol solution is allowed to cool, whereupon the substantially pure cholesterol is precipitated from it, and separated from the solution by decantation or filtration.

By the foregoing process, we have isolated the following compounds from the poisons of various species of toads.

A. Ch'an Su, the purchased cakes of dried poison from the Chinese toad:
1. Cholesterol*
2. Cinobufagin*
3. Cinobufotoxin
4. Cinobufotenine B. *Bufo marinus* (Jamaican)
1. Cholesterol*
2. Marinobufagin* (Called "bufagin" by Abel, who first isolated it.)
3. Marinobufotoxin C. *Bufa arenarum* (Uruguayan)
1. Cholesterol
2. Arenobufagin
3. Arenobufotoxin
4. Arenobufotenine D. *Bufo formosus* (Japanese)
1. Cholesterol*
2. Gamabufagin*
3. Gamabufotoxin*
4. Gamabufotenine E. Bufo *viridis viridis* (European)
1. Cholesterol
2. Viridobufagin
3. Viridobufotoxin
4. Viridobufotenine F. *Bufo bufo bufo or B. vulgaris* (European)
1. Cholesterol*
2. Vulgarobufotoxin* (Called "bufatoxin" by Wieland, who first isolated it.)
3. Vulgarobufotenine* (Called "bufotenine" by Handovsky, who first isolated it.)

G. *Bufo regularis* (South African)
1. Cholesterol
2. Regularobufagin
3. Regularobufotoxin H. *Bufo alvarius* (Arizonian)
1. Cholesterol
2. Alvarobufotoxin
3. Alvarobufotenine I. *Bufo valliceps* (Louisianian)
1. Cholesterol
2. Vallicepobufagin
3. Vallicepobufotoxin
4. Vallicepobufotenine J. *Bufo fowleri* (Louisianian)
1. Cholesterol
2. Fowlerobufagin
3. Fowlerobufotoxin
4. Fowlerobufotenine The items which are marked with an asterisk (*) have been obtained by other workers preceding us, but not by our process, and we are the first to produce them by our process. We believe that we are the first to obtain from the species indicated the products which are not marked with an asterisk, whether produced by our process or by any other process; and that with the exception of cholesterol those products are new with us regardless of their source.

Be believe that all the bufagins, and all the bufotoxins, and all the bufotenines, are different from one another, although generically similar in the respective classes.

We claim as our invention:

1. The process of obtaining bufotenine from toad poison, comprising extracting dried toad poison with a solvent of the class comprising alcohols and acetone, evaporating the extract to substantial dryness, and extracting the residue with water to obtain the bufotenine in solution.

2. The process of obtaining bufotenine from toad poison, comprising extracting dried toad poison with a highly concentrated solvent of the class comprising alcohols and acetone, evaporating the extract to substantial dryness, and extracting the residue with water to obtain the bufotenine in solution.

3. The process of obtaining bufotenine from toad poison, comprising extracting dried toad poison with a solvent of the class comprising alcohols and acetone, evaporating the extract to substantial dryness under vacuum at low temperature, and extracting the residue with water to obtain the bufotenine in solution.

4. The process of obtaining bufotenine from toad poison, comprising extracting dried toad poison with a solvent of the class comprising alcohols and acetone, evaporating the extract to substantial dryness, extracting the residue with water, shaking out the water extract so obtained with a solvent of the class comprising chloroform and alcohols which are nonmiscible with water, and separating the resultant aqueous solution from the chloroform or alcohol solution to obtain purified bufotenine in the aqueous solution.

5. The process of obtaining bufotenine from toad poison, comprising extracting dried toad poison with a solvent of the class comprising alcohols and acetone, evaporating the extract to substantial dryness, extracting the residue with water, shaking out the water extract so obtained with a solvent of the class comprising chloroform and alcohols which are non-miscible with water, separating the resultant aqueous solution from the chloroform or alcohol solutions to obtain purified bufotenine in the aqueous solution, and precipitating such bufotenine by adding an acid of the class comprising flavianic and picric acids.

6. The process of obtaining certain products from toad poison, comprising extracting dried toad poison with a solvent of the class comprising alcohols and acetone, evaporating the extract to substantial dryness, extracting the residue with water to remove bufotenine therefrom; extracting the remaining residue with an alcohol, and adding ether to the alcohol extract thus obtained to precipitate bufotoxin.

7. The process of obtaining certain products from toad poison, comprising extracting dried toad poison with a solvent of the class comprising alcohols and acetone, evaporating the extract to substantial dryness, extracting the residue with water to remove bufotenine therefrom; extracting the remaining residue with an alcohol, adding ether to the alcohol extract thus obtained to precipitate bufotoxin, and purifying the bufotoxin thus obtained by re-solution in alcohol and fractional precipitation with dry ether.

8. The process of obtaining certain products from toad poison, comprising extracting dried toad poison with a solvent of the class comprising alcohols and acetone, evaporating the extract to substantial dryness, extracting the residue with water to remove bufotenine therefrom; extracting the remaining residue with an alcohol, adding ether to the alcohol extract thus obtained to precipitate bufotoxin; evaporating to dryness the alcoholic ether solution remaining after the precipitation of bufotoxin, re-extracting the residue thus obtained with alcohol and shaking out with a mixture of chloroform and ether, drying the chloroform-ether solution so obtained and evaporating it to dryness, dissolving the residue in absolute alcohol to make a substantially saturated solution, and adding dry petroleum ether to precipitate bufagin.

9. The process of obtaining certain products from toad poison, comprising extracting dried toad poison with a solvent of the class comprising alcohols and acetone, evaporating the extract to substantial dryness, extracting the residue with water to remove bufotenine therefrom; extracting the remaining residue with an alcohol, adding ether to the alcohol extract thus obtained to precipitate bufotoxin; evaporating to dryness the alcoholic ether solution remaining after the precipitation of bufotoxin, re-extracting the residue thus obtained with alcohol and diluting the resultant extract with water to the point of incipient precipitation and then shaking out with a mixture of chloroform and ether, drying the chloroform-ether solution so obtained and evaporating it to dryness, dissolving the residue in absolute alcohol to make a substantially saturated solution, and adding dry petroleum ether to precipitate bufagin.

10. The process of obtaining certain products from toad poison, comprising extracting dried toad poison with a solvent of the class comprising alcohols and acetone, evaporating the extract to substantial dryness, extracting the residue with water to remove bufotenine therefrom; extracting the remaining residue with an alcohol, adding ether to the alcohol extract thus obtained to precipitate bufotoxin; evaporating to dryness the alcoholic ether solution remaining after the precipitation of bufotoxin, re-extracting the residue thus obtained with alcohol and then shaking out with a mixture of chloroform and ether, drying the chloroform-ether solution so obtained and evaporating it to dryness, dissolving the residue in absolute alcohol to make a substantially saturated solution, adding dry petroleum ether to precipitate bufagin, and purifying the bufagin by recrystallization from alcohol.

11. The process of obtaining certain products from toad poison, comprising extracting dried toad poison with a solvent of the class comprising alcohols and acetone, evaporating the extract to substantial dryness, extracting the residue with water to remove bufotenine therefrom; extracting the remaining residue with an alcohol, adding ether to the alcohol extract thus obtained to precipitate bufotoxin; evaporating to dryness the alcoholic ether solution remaining after the precipitation of bufotoxin, re-extracting the residue thus obtained with alcohol and shaking out with a mixture of chloroform and ether, drying the chloroform-ether solution so obtained and evaporating it to dryness, dissolving the residue in absolute alcohol to make a substantially saturated solution, adding dry petroleum ether to precipitate bufagin; evaporating the remaining solution to dryness, and extracting the residue so obtained with petroleum ether to obtain a solution of cholesterol.

12. The process of obtaining certain products from toad poison, comprising extracting dried toad poison with a solvent of the class comprising alcohols and acetone, evaporating the extract to substantial dryness, extracting the residue with water to remove bufotenine therefrom; extracting the remaining residue with an alcohol, adding ether to the alcohol extract thus obtained to precipitate bufotoxin; evaporating to dryness the alcoholic ether solution remaining after the precipitation of bufotoxin, re-extracting the residue thus obtained with alcohol and shaking out with a mixture of chloroform and ether, drying the chloroform-ether solution so obtained and evaporating it to dryness, dissolving the residue in absolute alcohol to make a substantially saturated solution, adding dry petroleum ether to precipitate bufagin; evaporating the remaining solution to dryness, extracting the residue so obtained with petroleum ether to obtain a solution of cholesterol; and purifying the cholesterol by evaporating the petroleum ether solution to dryness, dissolving the residue therefrom in hot alcohol, and allowing the hot alcohol solution to cool to precipitate cholesterol therefrom.

HANS JENSEN.
KO KUEI CHEN.